Oct. 19, 1937.      F. MILLER      2,096,056
ROTARY CUTTING TOOL
Filed March 25, 1936
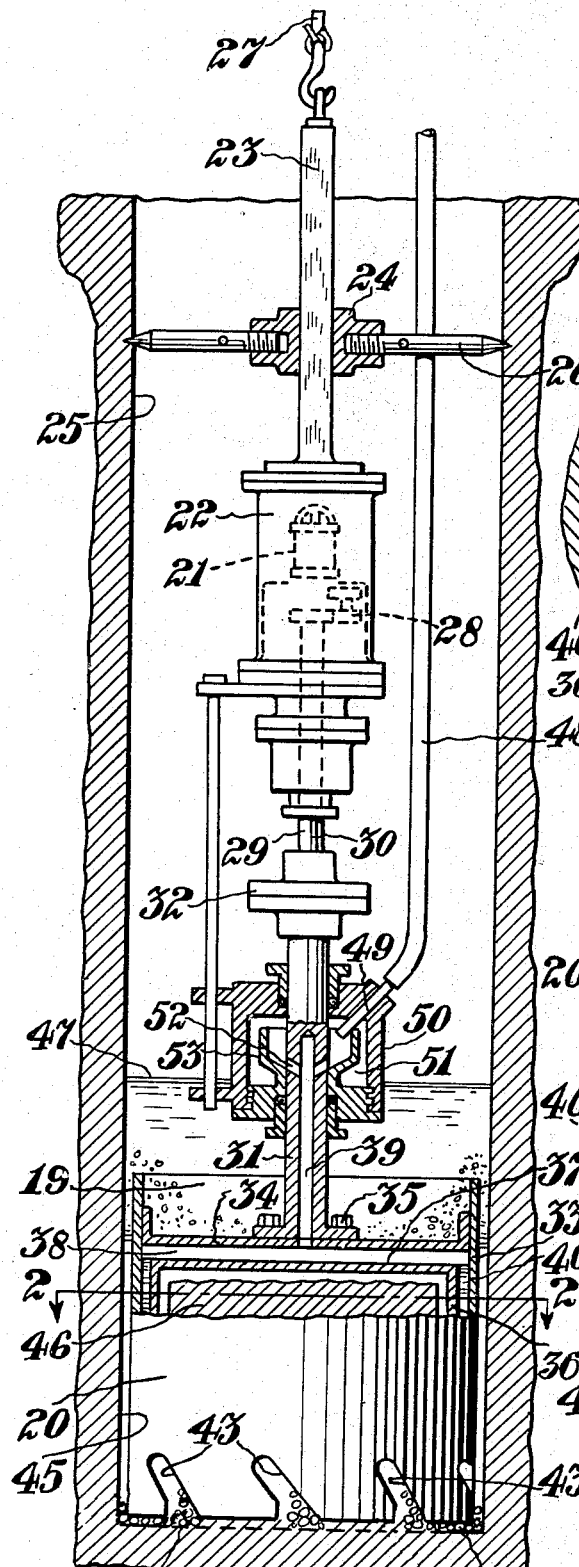
INVENTOR
*Frank Miller.*
BY
HIS ATTORNEY.

Patented Oct. 19, 1937

2,096,056

UNITED STATES PATENT OFFICE 2,096,056

ROTARY CUTTING TOOL

Frank Miller, East Orange, N. J., assignor to Ingersoll-Rand Company, Jersey City, N. J., a corporation of New Jersey Application March 25, 1936, Serial No. 70,725

2 Claims. (Cl. 255—72)

This invention relates to soil cutting tools, and more particularly to rotary cutting tools and the method of use of such tools for drilling wells and the like and which operate to cut annular channels in the earth formation to sever cores therefrom.

Heretofore, in the operation of devices of this character it has been customary to direct a stream of water into the hole being drilled throughout the entire drilling period in order to maintain a clean working surface for the cutting tool. As will be readily appreciated, the incessant delivery of water to the cutting tool throughout a period of time required for cutting a core of even moderate dimensions results in the accumulation of an extremely large volume of water in the drill hole, and the operation of removing such water in order that access may be had to the core greatly delays the progress of the work.

It is accordingly an object of the invention to eliminate the necessity of handling undue quantities of flushing liquid.

Another object is to assure a clean working surface for the cutting elements of the cutting tool.

Other objects will be in part obvious and in part pointed out hereinafter.

In the drawing accompanying this specification and in which similar reference numerals refer to similar parts, Figure 1 is an elevation, partly broken away, of a rotary cutting tool constructed in accordance with the practice of the invention and driving mechanism therefor, Figure 2 is a transverse view taken through Figure 1 on the line 2—2, and Figure 3 is a perspective view, partly broken away, of the cutting tool.

Referring more particularly to the drawing, the rotary cutting tool, constructed in accordance with the practice of the invention, is designated 20. It is shown connected to be driven by a motor 21 within a casing 22 and the casing may be affixed, in any suitable manner, to the end of a stem 23.

The stem 23 is preferably of polygonal shape. It extends slidably through a guide member 24 which is centralized with respect to the drill hole 25 by means of pointers 26 which are threaded into the guide member 24 and engage the wall of the drill hole 25. The upper end of the stem 23 may be connected to a cable 27 or other suitable device whereby the drilling apparatus may be raised and lowered into the drill hole 25.

The rotary movement of the motor 21 is transmitted through suitable gearing 28 to a shaft 29 connected to the cutting tool 20. The shaft 29 preferably consists of upper and lower sections 30 and 31, respectively, which are connected together by a coupling device 32.

The rotary cutting tool 20, constructed in accordance with the practice of the invention, is of the annular type. It comprises an outer tubular member 33 containing a transverse plate or wall 34 to which the shaft section 31 is secured, as by bolts 35. The transverse plate 34 is located intermediate the ends of the tubular member 33 and the space within the member 33 and above the plate 34 constitutes a chamber 19 wherein the cuttings, rising in the drill hole, may accumulate.

Within the tubular member 33 is a second tubular member 36 having a wall 37 at its inner end which, in the assembled positions of the tubular members, is spaced with respect to the plate 34 and cooperates therewith and with the tubular member 33 to define a chamber 38 for pressure fluid, as for example compressed air. Such pressure fluid is conveyed to the chamber 38 by a passage 39 in the shaft section 31 and the plate 34.

The tubular members 33 and 36 are maintained in coaxial relationship with respect to each other by strips or plates 40 extending longitudinally of the tubular members and to which they may be fixedly secured, in any well known manner, as by welding. The plates 40 are spaced with respect to each other to define therebetween and between the tubular members 33 and 36 passages 41 through which pressure fluid may flow from the chamber 38 to the cutting end 42 of the tool 20. In this end of the tool are formed a series of inclined slots 43 which extend through the members 33 and 36 and into the plates 40 to define cutting teeth 44 whereby the annular kerf 45 is cut into the rock to sever the core 46 from the mass.

The cutting tool may be of any suitable length and is, during its operation, immersed in a body of liquid 47. The liquid extends above the cutting tool only a sufficient distance to enable the cuttings floating therein to rise above the accumulator chamber 19. The liquid 47 employed for this purpose may be pumped or poured directly into the drill hole 25 without passing it through the drilling apparatus.

The pressure fluid supplied to the chamber 38 is conveyed into the drill hole by a hose 48 leading from a suitable source of pressure fluid supply. In the lower end of the hose is a nozzle 49 which extends into a box 50 disposed about the shaft section 31. The box may be secured to the shaft in any suitable manner and its interior 51 communicates with the passage 39 through ports 52 in the shaft section 31. The outlet end of the nozzle 49 extends, in the present instance, into a hopper 53 which serves to guide abrading material, for example chilled shot 54, into the passage 39. The abradant 54 may be conveyed into the hopper 53 by the hose 48 and passes through the channels in the cutting tool to the cutting teeth 44.

The operation of the device and the method of drilling therewith are as follows: After the work is sufficiently advanced so that the cutting tool lies below the surface of the ground, the entire body of liquid 47 used throughout the drilling operation is placed into the drill hole. The volume of liquid used for this purpose varies, of course, with the diameter and length of the cutting tool but should be of such extent that the column of liquid extends about one foot above the cutting tool. The amount of liquid required throughout a drilling operation may, therefore, be predetermined since it is definitely proportionate to the dimensions of the cutting tool.

During the ensuing rotary motion of the cutting tool, for advancing the kerf 45, pressure fluid is supplied to the chamber 38. It flows through the passages 41 to the bottom of the kerf 45 and dislodges the cuttings from the working surface.

The pressure fluid impels and carries the cuttings upwardly through the liquid 47, and when the cuttings rise above the cutting tool they are deflected inwardly by the expanding column of pressure fluid and precipitated into the accumulator chamber 19. Substantially all the fine particles cut from the rock will be deposited in the chamber 19 in this manner and are removed to the surface when the drilling mechanism is withdrawn from the drill hole, as when a core of the extent which the cutting tool will accommodate has been cut from the mass.

After the drilling apparatus has been removed from the drill hole the comparatively small body of liquid 47 is pumped to the surface and access may then be had to the core 46 for securing it to a lifting device.

As will be readily appreciated, by immersing the cutting tool in only sufficient water to cover it only a small amount of water need be handled as compared with drilling devices requiring continuous streams of water throughout the entire operation for maintaining a clean working surface. It will, moreover, be appreciated that by passing the pressure fluid through the wall of the cutting tool directly to the cutting teeth the pressure fluid will exert no substantial lifting effect upon the drilling apparatus as would be the case were the pressure fluid introduced between the core 46 and the wall forming the bottom of the chamber 19. By conveying the pressure fluid directly to the cutting teeth through channels in the cutting tool such pressure fluid will escape to the atmosphere through the usual clearance developed between the cutting tool and the wall of the drill hole.

I claim:

1. A rotary cutting tool, comprising an outer tubular member and an inner imperforate cup-shape member, cutting elements on the members, means on the outer member cooperating with the end of the cup-shaped member to define a chamber for cleansing fluid, and means for holding the members in spaced relation with respect to each other and to cooperate with the said members to define a passageway for conveying cleansing fluid from the chamber to the cutting elements.

2. A rotary cutting tool, comprising a tube, a transverse wall in the tube, a second tube within the first said tube having an imperforate end wall cooperating with the transverse wall and the first said tube to define a chamber for pressure fluid, cutting teeth on the tubes, and spacers between the tubes and cooperating therewith to define passages for conveying pressure fluid from the chamber to each of the cutting teeth.

FRANK MILLER.